(12) United States Patent
Suzuki

(10) Patent No.: US 9,754,162 B2
(45) Date of Patent: Sep. 5, 2017

(54) IMAGE PROCESSING METHOD AND DEVICE FOR ADAPTIVE IMAGE ENHANCEMENT

(71) Applicant: SAMSUNG DISPLAY CO., LTD., Yongin-si, Gyeonggi-Do (KR)

(72) Inventor: Kenji Suzuki, Yokohama (JP)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/956,526

(22) Filed: Dec. 2, 2015

(65) Prior Publication Data

US 2016/0162756 A1   Jun. 9, 2016

(30) Foreign Application Priority Data

Dec. 5, 2014 (JP) .................. 2014-246553

(51) Int. Cl.
| | | |
|---|---|---|
| G06K 9/00 | (2006.01) | |
| G06K 9/46 | (2006.01) | |
| G06K 9/62 | (2006.01) | |
| G06T 5/00 | (2006.01) | |

(52) U.S. Cl.
CPC ....... G06K 9/00456 (2013.01); G06K 9/4652 (2013.01); G06K 9/4661 (2013.01); G06K 9/6202 (2013.01); G06T 5/003 (2013.01)

(58) Field of Classification Search
CPC .... G06K 9/4652; G06K 9/3233; G06K 9/325; G06K 9/4661; G06K 9/6202; G06T 11/001; G06T 7/0081; G06T 3/403; G06T 2207/10024
USPC ........................................................ 382/165
See application file for complete search history.

(56) References Cited

U.S. PATENT DOCUMENTS

| | | | | |
|---|---|---|---|---|
| 5,760,921 A | * | 6/1998 | Miyake .............. | H04N 1/40068 |
| | | | | 358/3.07 |
| 7,881,539 B2 | * | 2/2011 | Kondo ............... | G06K 9/00456 |
| | | | | 382/199 |
| 2012/0275691 A1 | * | 11/2012 | Hosokawa ......... | G06K 9/00442 |
| | | | | 382/159 |

FOREIGN PATENT DOCUMENTS

| | | |
|---|---|---|
| JP | 1169150 | 3/1999 |
| JP | 2002015327 | 1/2002 |
| JP | 2003046771 | 2/2003 |
| JP | 2003219163 | 7/2003 |
| JP | 2005505870 | 2/2005 |
| JP | 2005258683 | 9/2005 |

(Continued)

*Primary Examiner* — Kanjibhai Patel
(74) *Attorney, Agent, or Firm* — F. Chau & Associates, LLC

(57) ABSTRACT

An image processing device includes an artificial image determining unit configured to determine whether a pixel is in an artificial image by using two or more different determination criteria or conditions based on an input image signal, where the determination criteria include any one or more of a first determination criterion for determining whether the pixel is part of an artificial image by determining whether a predetermined area including the pixel represents a flat area, a second determination criterion for determining whether the pixel is part of an artificial image by determining whether the predetermined area represents a gradation area, or a third determination criterion for determining whether the pixel is part of an artificial image by determining whether the predetermined area represents a color change area.

20 Claims, 10 Drawing Sheets

(56) References Cited

FOREIGN PATENT DOCUMENTS

| JP | 2007251687 | 9/2007 |
|----|------------|--------|
| WO | 03034335   | 4/2003 |

* cited by examiner

IMAGE PROCESSING METHOD AND DEVICE FOR ADAPTIVE IMAGE ENHANCEMENT

CROSS-REFERENCE TO RELATED APPLICATION

This U.S. non-provisional patent application claims priority under 35 U.S.C. §119(a) (post-PLT) to Japanese Patent Application No. JP2014-246553, filed on Dec. 5, 2014, the entire contents of which are hereby incorporated by reference.

TECHNICAL FIELD

The present disclosure relates to image processing. In particular, the inventive concept is applicable to adaptive image enhancement of natural and artificial images.

DISCUSSION OF RELATED ART

When image sharpening is performed on an image, an edge enhancement filter may be used for enhancing an edge with respect to an input image signal. Sharpness of an edge of an image may be enhanced by adding or subtracting to or from the input image signal, respectively, a gain that is an application result of the edge enhancement filter.

For example, sharpness of an image may be enhanced by performing a process using an edge enhancement filter on an image captured by an imaging device or on an image received from a broadcasting station or the like. When the process using the edge enhancement filter is performed on a character, figure, icon, or the like generated by software, ringing may occur, and, moreover, there is a possibility of degradation in display quality. Hereinafter, a character or figure generated by a computer or software is referred to as an artificial image, and an image other than the artificial image, such as a captured image or an image received from a broadcasting station or the like, is referred to as a natural image.

SUMMARY

The present disclosure provides an image processing device, related method, and program storage device capable of adaptively determining whether an image area including multiple pixels is artificial or natural.

An exemplary embodiment of the inventive concept provides an image processing device including an artificial image determination unit configured to determine whether an image is artificial by using two or more different determination criteria or conditions for determining whether the image is artificial on the basis of an input image signal, and to determine whether an image for each pixel included in an input image represented by the input image signal represents an artificial image on the basis of a function or logical combination of results determined under the determination criteria, wherein the determination criteria include any one or more of a first determination criterion for determining whether a current pixel is an artificial image by using pixel values of pixels included in a predetermined area in which the current pixel and neighboring pixels around the current pixel are present in a matrix arrangement, and by determining whether the predetermined area represents a flat area; a second determination criterion for determining whether the current pixel represents an artificial image by using gradation values of the pixels included in the predetermined area to determine whether the predetermined area represents a gradation area; and a third determination criterion for determining whether the current pixel represents an artificial image by determining a color change in the predetermined area based on a dynamic range of a gradation value of each of the neighboring pixels.

According to this configuration, since it is possible to determine whether an image for each pixel is artificial or natural by using a result determined under each of a plurality of determination criteria for determining an artificial image, the artificial image or natural image may be more accurately determined. Accordingly, whether an image for each pixel is artificial or natural may be determined on the basis of an input image.

In an exemplary embodiment, the artificial image determining unit includes a logic circuit having at least one logic gate configured to determine whether an image is artificial using a logical combination of a plurality of the results determined under the determination criteria.

In an exemplary embodiment, the artificial image determining unit includes a function circuit configured to apply different non-zero weights to a plurality of the results determined under the determination criteria.

In an exemplary embodiment, when the determination is performed under the first determination condition, the artificial image determining unit may calculate a first absolute value by taking an absolute value to a difference between a pixel value of the current pixel and a pixel value each of the neighboring pixels, calculate a first number including the first absolute value when the first absolute value is equal to or greater than a first threshold value, and determine that the current pixel represents an artificial image when the first number is smaller than a second threshold value.

In an exemplary embodiment, the artificial image determining unit may calculate the first absolute value that is a difference between pixel values of pixels neighboring in a horizontal direction and in a vertical direction of the input image.

In an exemplary embodiment, the artificial image determining unit may calculate the first absolute value for each of three primary colors of light on the basis of a color signal corresponding to the input image signal.

In an exemplary embodiment, when the determination is performed under the second determination condition, the artificial image determining unit may perform gradation determinations in horizontal and vertical directions of the input image in the predetermined area, and determine that the current pixel represents the artificial image when it is determined that the gradation is represented in at least any one of the horizontal and vertical directions.

In an exemplary embodiment, the artificial image determining unit may calculate a second absolute value by taking an absolute value to a difference between gradation values of pixels neighboring in the horizontal direction, for each of the rows in the predetermined area, calculate a second number including the second absolute value of each of the rows in the predetermined area, and when the second absolute value is equal to or smaller than a third threshold value, determine that the predetermined area represents the gradation in the horizontal direction when the second number is greater than a fourth threshold value.

In an exemplary embodiment, the artificial image determining unit may calculate a third absolute value by taking an absolute value to a difference between gradation values of pixels neighboring in the vertical direction, calculate a third number including the third absolute value for each of the columns in the predetermined area, and when the third absolute value of each of the columns in the predetermined area is equal to or smaller than a fifth threshold value, determine that the predetermined area represents the gradation in the vertical direction when the third number of each of the columns in the predetermined area is greater than a sixth threshold value In an exemplary embodiment, when the determination is performed under the third determination condition, the artificial image determining unit may calculate the dynamic range for each of three primary colors of light on the basis of a color signal corresponding to the input image signal, and determine that the current pixel in the predetermined area represents the artificial image by using the three calculated dynamic ranges when it is determined that one color of the three primary colors has a larger change and other two primary colors have small changes, or when it is determined that one color of the three primary colors has a smaller change and other two primary colors have large changes.

In an exemplary embodiment, the artificial image determining unit may determine that the one color of the three primary colors has the larger change and the other two colors have smaller changes when one of the three calculated dynamic ranges is equal to or greater than a seventh threshold value and the other two dynamic ranges are smaller than an eighth threshold value, and determine that the one color of the three primary colors has the smaller change and the other two colors have the large changes when two of the three calculated dynamic ranges are equal to or greater than the seventh threshold value and another dynamic range is smaller than the eighth threshold value.

In an exemplary embodiment, the function or logical combination may be a logical OR operation of the determined results according to the determination criteria.

In an exemplary embodiment, the artificial image determining unit may determine, for each pixel, an artificial image degree, which represents a degree of how much the image is artificial, to determine whether an image of each pixel included in the input image is part of an artificial image.

In an exemplary embodiment, the artificial image determining unit may allocate a maximum value of the artificial image degree to a pixel determined to be part of the artificial image as a result of the logical combination, allocate a minimum value of the artificial image degree to a pixel not determined as part of the artificial image, and determine the artificial image degree for each pixel by performing spatial-filtering on a plurality of pixels to which the artificial image degrees are allocated.

In an exemplary embodiment, the image processing device may further include: a first image processing unit configured to perform a first image process on the input image signal, and a synthesizing unit configured to synthesize the input image signal and an image signal on which the first image process is performed.

In an exemplary embodiment, the determined result may be the artificial image degree, which represents the degree to which each pixel is artificial, and the synthesizing unit may synthesize, for each pixel, the input image signal and the image processed by the first image processing unit on the basis of the artificial image degree.

In an exemplary embodiment, the artificial image determining unit may further perform a magnification process on the determined result and include a second image processing unit configured to perform a second image process including the magnification process for the determined result; a third image processing unit configured to perform a third image process, which includes the magnification process and an edge enhancement process, different from the second image process; and a synthesizing unit configured to synthesize an image signal on which the second image process is performed and an image signal on which the third image process is performed on the basis of the determined result of the artificial image determining unit.

In an exemplary embodiment, the third image processing unit may determine whether the current pixel is included in the flat area on the basis of a pixel value of the current pixel and a pixel value of each of the neighboring pixels, set at least any one of a lowest correction limit value and a highest correction limit value for each pixel, and clip an image signal on which the magnification process and edge enhancement process are performed with any one of the lowest correction limit value and the highest correction limit value.

In an exemplary embodiment of the inventive concept, an image processing method includes determining whether an image is artificial by using two or more different determination criteria for determining whether the image is artificial on the basis of an input image signal, and determine whether an image for each pixel included in an input image represented by the input image signal represents an artificial image on the basis of a function or logical combination of results determined under the determination criteria, where the determination criteria include any one or more of a first determination criterion for determining whether a current pixel is an artificial image by using pixel values of pixels included in a predetermined area in which the current pixel and neighboring pixels around the current pixel are present in a matrix arrangement, and by determining whether the predetermined area represents a flat area; a second determination criterion for determining whether the current pixel represents the artificial image by using gradation values of the pixels included in the predetermined area to determine whether the predetermined area represents a gradation area; and a third determination criterion for determining whether the current pixel represents the artificial image by determining a color change in the predetermined area based on a dynamic range of a gradation value of each of the neighboring pixels.

According to this exemplary method, whether an image of each pixel is artificial or natural may be determined using a result determined under each of a plurality of determination criteria that are different from each other. Accordingly, whether the image of the pixel is artificial or natural may be more accurately determined.

In an exemplary embodiment of the inventive concept, a stored program instructs a computer to function as an artificial image determining device for determining whether an image is artificial by using two or more different determination criteria for determining whether the image is artificial on the basis of an input image signal, and determine whether an image for each pixel included in an input image represented by the input image signal represents an artificial image on the basis of a function or logical combination of results determined under the determination criteria, where the determination criteria include any one or more of a first determination criterion for determining whether a current pixel is an artificial image by using pixel values of pixels included in a predetermined area in which the current pixel and neighboring pixels around the current pixel are present in a matrix arrangement, and by determining whether the predetermined area represents a flat area; a second determination criterion for determining whether the current pixel represents an artificial image by using gradation values of the pixels included in the predetermined area to determine whether the predetermined area represents a gradation area; and a third determination criterion for determining whether the current pixel represents an artificial image by determining a color change in the predetermined area based on a dynamic range of a gradation value of each of the neighboring pixels.

According to the usage of this exemplary program, since it is possible to determine whether an image around each pixel is artificial or natural by using a result determined under each of a plurality of determination criteria for determining an artificial image, the artificial image or natural image may be more accurately determined. Accordingly, due to this configuration, whether an image for each pixel is artificial or natural may be accurately determined on the basis of an input image.

In an exemplary embodiment, an image processing system includes an input image port; a natural image processor with a filter connected to the input image port; an artificial image determinator with a plurality of different determination calculators connected to the input image port, and a degree generator connected to each of the determination calculators; a synthesizer connected to each of the natural image processor and the artificial image determinator; and an image display connected to the synthesizer, where the plurality of determination calculators includes at least one of a pixel difference calculator configured to determine a difference in pixel values between adjacent pixels, a gradation calculator configured to determine gradation values between adjacent pixels, or a dynamic range calculator configured to determine dynamic range values between adjacent pixels.

In an exemplary embodiment, an image processing system further includes a natural image magnifier connected between the input image port and the synthesizer; and an artificial image magnifier connected between the input image port and the synthesizer, where the artificial image determinator includes the degree generator connected to a degree area magnifier.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
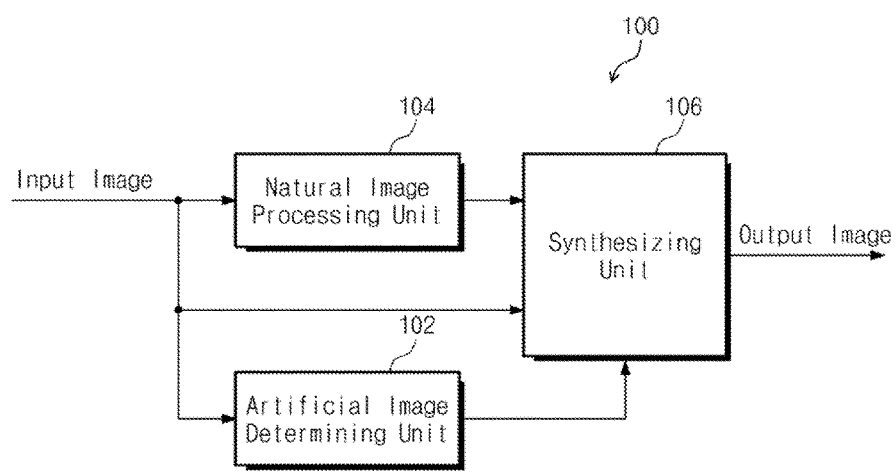
FIG. 1 is a block diagram illustrating an exemplary configuration of an image processing device according to an exemplary embodiment of the inventive concept.

The inventive concept will be described below by way of non-limiting example with reference to the accompanying drawings. Throughout the specification and drawings, like reference numerals may refer to like elements to minimize duplicative description.

An image processing method according to an exemplary embodiment of the inventive concept is provided. Hereinafter, an image processing method according to an exemplary embodiment of the inventive concept will be described in conjunction with an exemplary case where an image processing device performs a process according thereto. In the description that follows, an image may include a natural image and an artificial image, without limitation, such as both a natural image and an artificial image occurring in the same input image.

As shown in FIG. 1, an image processing device according to an exemplary embodiment of the inventive concept is indicated generally by the reference numeral 100. Here, an input image signal is represented as "Input Image," and an image signal after processing is represented as "Output Image."

The image processing device 100 includes an artificial image determining unit 102 connected to the input image signal, a natural image processing unit 104 connected to the input image signal, and a synthesizing unit 106 connected to each of the input image signal as well as the units 102 and 104. Here, the output of the unit 106 is the output image signal.

The image processing device may include a processor, such as a central processing unit (CPU) and/or various processing circuits, and/or a controller for controlling the entirety thereof. The controller may perform roles of the artificial image determining unit 102, the natural image processing unit 104, and/or the synthesizing unit 106.

In addition, one or more of the artificial image determining unit 102, natural image processing unit 104, and synthesizing unit 106 may be realized with a processing circuit (e.g., a dedicated or general-purpose processing circuit)

separate from the controller. Moreover, for one or more of the artificial image determining unit 102, natural image processing unit 104, and/or synthesizing unit 106, the process may be realized with a program or software executed from storage by the processing circuit or the like.

The artificial image determining unit 102 is configured to determine the presence and extent of an artificial image or area within the input image using a pixel included therein to assess artificiality on the basis of a function or logical combination of the results determined under two or more different determination criteria. The artificial image determining unit 102 may output, for example, an artificial image degree for each pixel as the result of determining artificial image scores for each pixel.

Figure 2:
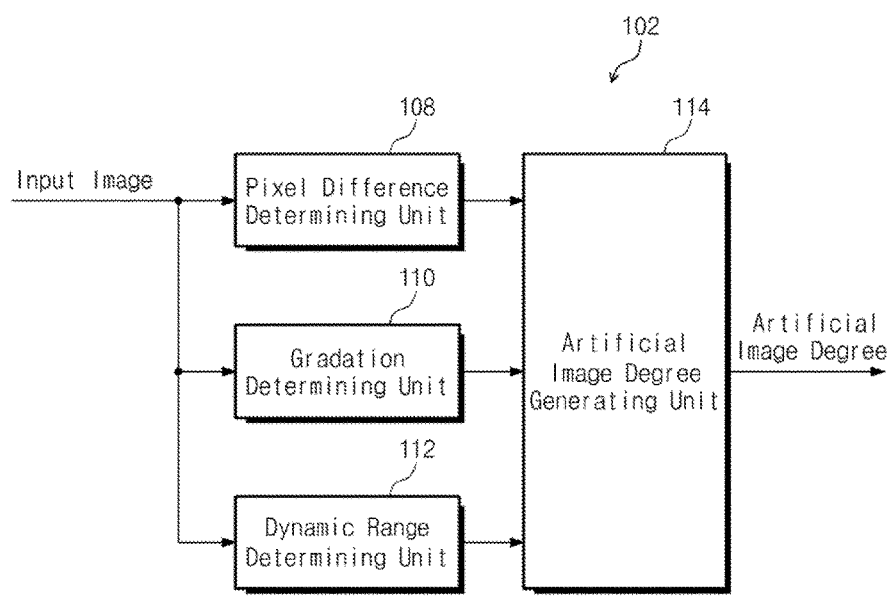
FIG. 2 is a block diagram illustrating an exemplary configuration of an artificial image determining unit according to an exemplary embodiment of the inventive concept.

Turning to FIG. 2, an exemplary artificial image determining unit according to an exemplary embodiment of the inventive concept is indicated generally by the reference numeral 102. The artificial image determining unit 102 may include a pixel difference determining unit 108 connected to the input image signal, a gradation determining unit 110 connected to the input image signal, a dynamic range determining unit 112 connected to the input image signal, and an artificial image degree generating unit 114 connected to each of the units 108, 110 and 112.

The pixel difference determining unit 108 is configured to determine whether each pixel represents an artificial image area by using the first determination criterion. The pixel difference determining unit 108 may determine whether the current pixel may be included in the artificial image area on the partial basis of a difference of pixel values between adjacent pixels.

The pixel value difference between the adjacent pixels according to exemplary embodiments of the inventive concept may be, for example, an absolute value of the difference between pixel values of adjacent pixels. Hereinafter, the difference between pixel values of the adjacent pixels may simply be referred to as a "pixel value difference."

In operation, an image processing device according to an exemplary embodiment of the present inventive concept determines whether an image area is artificial by using each of two or more different determination criteria or conditions responsive to an input image signal. The exemplary image processing device determines whether the area is an artificial image for each pixel included in an input image, which the input image signal represents, on the basis of a function or logical combination of results determined under two or more determination criteria in an artificial image determination process.

The input image signal may be, for example, a signal for representing a video or a still image, such as a component type signal. Hereinafter, a case where the input image signal is a three-primary-color signal of red R, green G, and blue B will be described, although it is not limited thereto. In addition, the input image signal according to an exemplary embodiment of the inventive concept may include a luminescence signal and chrominance signal.

The determination criteria according to this exemplary embodiment of the inventive concept may be, for example, the first to third determination criteria as set forth below.

The first determination criterion is a determination criterion for determining whether an image area is artificial by using the fact that there are many cases where an artificial image area includes a chromatically or pixel-wise flat area. The image processing device determines whether a pixel represents an artificial image area by using a pixel value of a pixel included in a predetermined area and determining whether the predetermined area represents such a flat area.

Here, the predetermined area is an area having a current pixel, such as a processing target pixel that attracts attention, as well as neighboring pixels of the current pixel arranged in a matrix around or about the current pixel. The predetermined area may be, for example, an area including a plurality of pixels of M×N, where M is the number of pixels in a horizontal direction and N is the number of pixels in a vertical direction of an image portion. Hereinafter, the case where M=N, an odd number, that is, a case where the predetermined area is an area of 3×3 or 5×5, for example, is exemplified as the predetermined area according to this exemplary embodiment of the inventive concept, although M need not equal N and need not be odd in alternate embodiments. When the predetermined area is a quadrangle, the current pixel may be, for example, at the center of the matrix area where the neighboring pixels are pixels surrounding the current pixel in the predetermined area.

When the predetermined area is determined to represent a chromatically or pixel-wise flat area of the input image, the image processing device may determine that the current pixel in the predetermined area represents an artificial image. In addition, when the predetermined area is determined not to represent such a flat area, the image processing device may determine that the current pixel in the predetermined area does not represent an artificial image.

An exemplary embodiment of the present inventive concept may include a process for determination of whether an image is artificial based on at least the first determination criterion of pixel-wise flatness.

The second determination criterion is a determination criterion for determining whether an image is artificial, considering that the artificial image area may include predictable gradation. The image processing device according to an exemplary embodiment of the inventive concept determines whether a predetermined area shows gradation by using a gradation value of a pixel included in the predetermined area. The image processing device may determine whether each pixel is an artificial image based at least in part on such gradation values.

For example, the image processing device measures gradation in a horizontal and in a vertical direction of an input image for the predetermined area. When gradation is represented in at least one of the horizontal and vertical directions, the image processing device may determine that the current pixel in the predetermined area represents an artificial image. In addition, when gradation is not represented in either of the horizontal or vertical directions, the image processing device does not determine that the current pixel in the predetermined area represents an artificial image.

An exemplary embodiment of the present inventive concept may include a process for determining whether an image is artificial based on at least the second determination criterion of gradation.

The third determination criterion is a determination criterion for determining whether an image is artificial by measuring a color change in a predetermined area.

The image processing device according to an exemplary embodiment of the inventive concept determines a color change in the predetermined area using a dynamic range of gradation values of the neighboring pixels included in the predetermined area. The dynamic range is defined as a difference between a maximum value and a minimum value for the neighboring pixels included in the predetermined area.

The image processing device calculates respective dynamic ranges for the primary colors of light on the basis of a color signal corresponding to the input image signal. The color signal corresponding to the input image signal may be the color signal included in the input image signal, or the color signal converted from luminance and chrominance signals included in the input image signal.

For example, when the color signal is included in the input image signal, the image processing device calculates a dynamic range by using the color signal. In addition, when the luminance signal and chrominance signal are included in the input image signal, the image processing device converts the luminance signal and chrominance signal included in the input image signal into a color signal, and calculates the dynamic range.

When only any one color among the three primary colors has a larger change and the other two colors have small changes, or only any one color among the three primary colors has a smaller change and the other two colors have large changes, the image processing device determines that a current pixel in a predetermined area represents an artificial image. In addition, when it is not the case where only any one color among the three primary colors has a larger change and other two colors have small changes, or only any one color among the three primary colors has a smaller change and other two colors have large changes, the image processing device according to an exemplary embodiment of the inventive concept determines that the current pixel in a predetermined area does not represent the artificial image. Such a determination criterion for color change may be particularly sensitive to artificial watermarks, for example.

An exemplary embodiment of the present inventive concept may include a process for the determination of the artificial image based on at least the third determination condition.

In addition, the determination criterion according to an exemplary embodiment of the inventive concept is not limited to any two of the first to third determination criteria. For example, the determination criterion according to another embodiment of the inventive concept may further include a determination criterion other than the first to third criteria.

The two or more determination criteria according to an exemplary embodiment of the inventive concept may include, for example, at least two determination criteria among the first to third determination criteria, or at least one of the first to third determination criteria plus a determination criterion different from any one or more of the first to third determination criteria.

The image processing device determines whether an image is artificial on the basis of the two or more determination criteria, and whether an image of each pixel included in the input image is an artificial image on the basis of a function or logical combination of results determined under two or more determination criteria.

The function or logical combination according to an exemplary embodiment of the inventive concept may be exemplified as a logical OR operation of the results determined under two or more determination criteria. When the function or logical combination is the logical OR operation, the image processing device determines that as a result of determining an artificial image under two or more determination criteria, a pixel determined to represent an artificial image under any one of the determination criteria represents the artificial image.

The function or logical combination is not limited to the logical OR operation. For example, the function or logical combination according to an exemplary embodiment of the inventive concept may be a logical AND operation. In addition, the function or logical combination of an exemplary embodiment of the inventive concept may be realized with, for example, a function or logical combination that two or more of NOT, logical OR, and logical AND operations are combined. The function may include summation, modulo arithmetic, magnification and/or scale factors for one or more of the results determined under the determination criteria, for example. Hereinafter, for ease of explanation, it is exemplified that the function or logical combination according to an exemplary embodiment of the inventive concept is a logical OR operation of the results determined under two or more determination criteria.

In addition, in the image processing device according to an exemplary embodiment of the inventive concept, determination of whether each pixel represents the artificial image is not limited to the above-described examples. The image processing device according to another embodiment of the inventive concept may determine whether each pixel represents the artificial image by determining an artificial image degree that represents the degree to which an image is artificial.

In detail, the image processing device allocates a maximum value of the artificial image degree (e.g., 255, 256, or the like) to a pixel determined to represent the artificial image, and allocates a minimum value (e.g., 0, 1, or the like) of the artificial image degree for a pixel determined not to represent the artificial image.

The image processing device determines the artificial image degree for each pixel by performing spatial-filtering on a plurality of pixels to which artificial image degrees are allocated, respectively. The image processing device determines the artificial image degree for each pixel by spatial-filtering that is performed using, for example, a Gaussian filter or an average filter.

The image processing device determines whether an image is artificial on the basis of the two or more determination criteria, and whether an image of each pixel included in the input image is artificial on the basis of a function or logical combination of the results determined under two or more determination criteria. In this case, the image processing device may more accurately determine whether each pixel represents an artificial image than in a case where an artificial image area is determined with only a pixel difference.

The image processing method is not limited to the process for determining whether an image is artificial. For example, the image processing device may perform an image process based on the determination result of the process for artificial image determination. An exemplary embodiment of the present inventive concept may include the image process based on the determination results of the process for artificial image determination.

The image processing device may perform a first image process, a second image process, or a third image process as the image processing method. Detailed descriptions will be provided regarding the first to third image processes.

A description will now be provided for a configuration of an image processing or display device capable of executing an image processing method according to an exemplary embodiment of the inventive concept.

Hereinafter, a configuration of the image processing device capable of performing another process, such as an image process based on the process for the artificial image determination, in addition to the process for artificial image determination, will be discussed in detail. In addition, hereinafter, it is exemplified that the image processing device according to an exemplary embodiment of the inventive concept determines whether each pixel included in the input image is artificial on the basis of a function or logical combination of the results determined under the first to third determination criteria in the process for artificial image determination.

Figure 3:
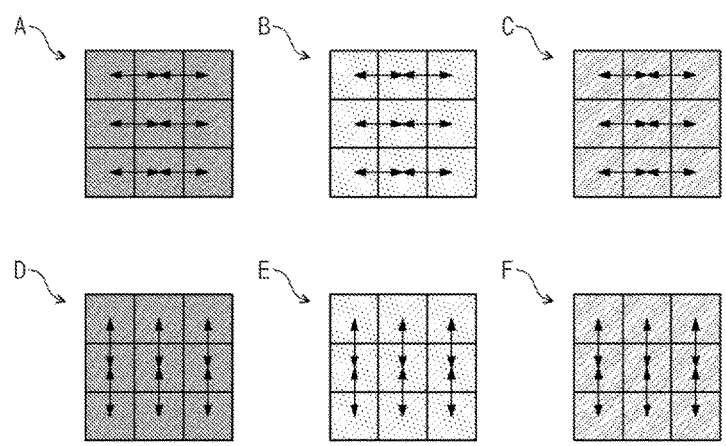
FIG. 3 is a conceptual diagram for explaining an exemplary process of pixel difference determining unit according to an exemplary embodiment of the inventive concept.

Turning now to FIG. 3, a case is illustrated where a pixel value difference is obtained for each of the three primary colors of light on the basis of a color signal corresponding to an input image signal according to an embodiment of the inventive concept. In FIG. 3, only, reference letters A and D correspond to red, reference letters B and E correspond to green, and reference letters C and F correspond to blue, each in the horizontal and vertical processing directions, respectively. In addition, as illustrated conceptually by A to C of FIG. 3, the pixel difference determining unit 108 of FIG. 2 calculates a pixel value difference between pixels adjacent in a horizontal direction of the image, and a pixel value difference between pixels adjacent in a vertical direction of the image. Here, groups of adjacent pixels for which the pixel value difference is calculated are represented with two-way arrows.

The pixel difference determining unit 108 determines whether a current pixel represents an artificial image according to steps (A-1) to (A-3) below.

In step (A-1), the pixel difference determining unit 108 extracts, as a predetermined area, for example, a 3×3 pixel area with the current pixel taken as the center. In addition, when extraction of the predetermined area corresponding to the current pixel is not available, the pixel difference determining unit 108 determines, for example, a corresponding pixel not to be an artificial image, and outputs "0" which represents a non-artificial image.

The pixel difference determining unit 108 calculates a pixel value difference between, for example, each group of 36 adjacent pixels represented as A to C and D to F in FIG. 3. The pixel difference determining unit 108 subtracts a gradation value of one adjacent pixel from a gradation value of another adjacent value and takes the absolute value of the subtracted value to calculate the pixel value difference.

In step (A-2), the pixel difference determining unit 108 calculates a first number, which is a number of a pixel value difference larger than a first threshold value or alternatively a number of a pixel value difference equal to or larger than a first threshold value. Here, the first threshold value may be "$1/255$", which is an example of a gradation value when the gradation value is represented in 8 bits, but the first threshold value according to an example of the inventive concept is not limited thereto. In addition, the first threshold value may be a preset fixed value, or a variable value that may be varied by manipulation of the image processing device 100.

In step (A-3), when the first number is equal to or smaller than a second threshold value, or alternatively when the first number is smaller than the second threshold value, the pixel difference determining unit 108 determines that the current pixel corresponding to the predetermined area represents the artificial image. In addition, the pixel difference determining unit 108 outputs "1" which represents an artificial image.

When the first number is larger than the second threshold value, or alternatively when the first number is equal to or larger than the second threshold value, the pixel difference determining unit 108 determines that the current pixel corresponding to the predetermined area does not represent the artificial image. In addition, the pixel difference determining unit 108 outputs "0", which represents a non-artificial image.

Here, the second threshold value may be, for example, "10", but the second threshold value according to an exemplary embodiment of the inventive concept is not limited hereto. In addition, the second threshold value may be a preset fixed value, or a variable value that may be varied by manipulation of the image processing device 100. Thus, the pixel difference determining unit 108 determines whether each pixel represents an artificial image according to steps (A-1) to (A-3). In addition, the process by the pixel difference determining unit 108 is not limited to the examples described above. For example, the pixel difference determining unit 108 may use a luminance value corresponding to the input image signal as a pixel value to calculate the pixel value difference between adjacent pixels. In addition, the pixel difference determining unit 108 may calculate one of a pixel value difference between pixels adjacent in a horizontal direction of the image as well as a pixel value difference between pixels adjacent in a vertical direction of the image.

The gradation determining unit 110 determines whether each pixel represents an artificial image by using the second determination criterion. The gradation determining unit 110 determines whether the current pixel is included in the artificial image area on the basis of a gradation value of a pixel included in the predetermined area.

Figure 4:
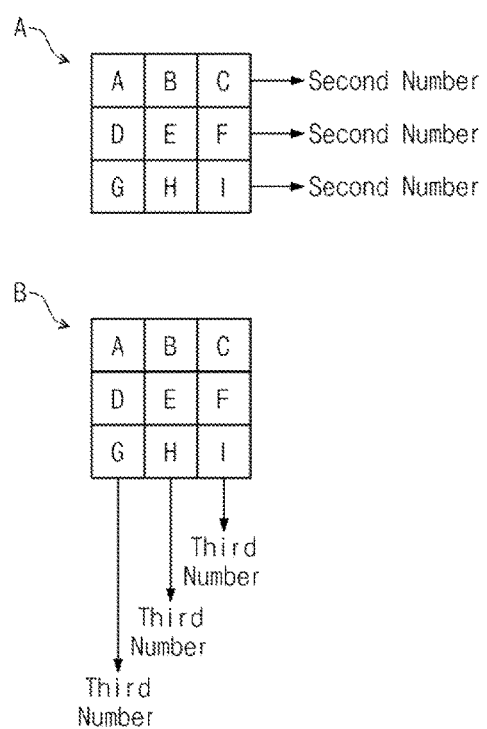
FIG. 4 is a conceptual diagram for explaining an exemplary process of a gradation determining unit according to an exemplary embodiment of the inventive concept.

As shown in FIG. 4, a conceptual diagram for explaining an exemplary process of the gradation determining unit 110 of FIG. 2 is provided according to an embodiment of the inventive concept. In FIG. 4, only, reference letter A represents an exemplary determination of gradation in a horizontal direction of the image, and reference letter B represents an exemplary determination of gradation in a vertical direction of the image.

The gradation determining unit 110 determines whether each pixel represents an artificial image, for example, according to steps (B-1) to (B-3) below.

In step (B-1), the gradation unit 110 extracts, as a predetermined area, for example, a 3×3 pixel area with the current pixel taken as the center. In addition, when extraction of the predetermined area corresponding to the current pixel is not available, the gradation determining unit 110 determines, for example, a corresponding pixel not to be an artificial image, and outputs "0" which represents a non-artificial image.

In step (B-2), the gradation determining unit 110 determines gradation in each of the horizontal and vertical directions in the predetermined area corresponding to each pixel.

For determination of gradation in the horizontal direction of the image, the gradation determining unit 110 calculates a pixel value difference between pixels adjacent in the horizontal direction for all rows of the predetermined area. The gradation determining unit 110 subtracts a gradation value of one adjacent pixel from another adjacent pixel, and calculates a pixel value difference by taking an absolute value of the subtracted value.

The gradation determining unit 110 calculates a second number, which is a number for the pixel value difference equal to or smaller than a third threshold value, or alternatively a number for the pixel value difference smaller than the third threshold value, for each row of a predetermined area.

Here, the third threshold value may again be "$1/255$", but the third threshold value according to an example of the inventive concept is not limited thereto. In addition, the third threshold value may be a preset fixed value, or a variable value that may be varied by manipulation of the image processing device 100.

The gradation determining unit 110 determines the predetermined area to represent the gradation in a horizontal direction when the second value is equal to or greater than a fourth threshold value, or alternatively when the second number is greater than the fourth threshold value, for all of the rows in the predetermined area. In addition, the gradation determining unit 110 determines the predetermined area not to represent the gradation in a horizontal direction when the second number is smaller than the fourth threshold value, or alternatively when the second number is equal to or smaller than the fourth threshold value, for all of the rows in the predetermined area.

Here, the fourth threshold value may be "2" (e.g., an example of the fourth threshold value in the case where the predetermined area is a 3×3 pixel area), but the fourth threshold value according to an exemplary embodiment of the inventive concept is not limited thereto. In addition, the fourth threshold value may be a preset fixed value, or a variable value that may be varied by manipulation of the image processing device 100.

For determination of the gradation in the horizontal direction of the image, the gradation determining unit 110 calculates a pixel value difference between pixels adjacent in the vertical direction for all columns of the predetermined area. The gradation determining unit 110 subtracts a gradation value of one adjacent pixel from another adjacent pixel, and calculates a pixel value difference by taking an absolute value of the subtracted value.

The gradation determining unit 110 calculates a third number, which is a number for the pixel value difference equal to or smaller than a fifth threshold value, or alternatively a number for the pixel value difference smaller than the fifth threshold value, for each column of the predetermined area.

Here, the fifth threshold value may be "1/255" (e.g., an example of a gradation value when the gradation value is represented in 8 bits), but the fifth threshold value according to an exemplary embodiment of the inventive concept is not limited thereto. In addition, the fifth threshold value may be a preset fixed value, or a variable value that may be varied by manipulation of the image processing device 100.

The gradation determining unit 110 determines the predetermined area to represent the gradation in a vertical direction when the third value is equal to or greater than a sixth threshold value, or alternatively when the third number is greater than the sixth threshold value, for all of the columns in the predetermined area. In addition, the gradation determining unit 110 determines the predetermined area not to represent the gradation in a vertical direction when the third number is smaller than the sixth threshold value, or alternatively when the third number is equal to or smaller than the sixth threshold value, for all of the columns in the predetermined area.

Here, the sixth threshold value may be "2" (e.g., an example of the sixth threshold value in the case where the predetermined area is a 3×3 pixel area), but the sixth threshold value according to an exemplary embodiment of the inventive concept is not limited thereto. In addition, the sixth threshold value may be a preset fixed value, or a variable value that may be varied by manipulation of the image processing device 100.

The gradation determining unit 110 determines that a pixel corresponding to a predetermined area represents an artificial image when the predetermined area corresponding to each pixel shows gradation in any one of its horizontal and vertical directions. In addition, the pixel difference determining unit 110 outputs "1" to indicate the artificial image.

In addition, the gradation determining unit 110 determines that a current pixel corresponding to a predetermined area does not represent an artificial image when the predetermined area corresponding to each pixel does not represent gradation in either of the horizontal or vertical directions. In addition, the gradation determining unit 110 outputs "0" to indicate a non-artificial image. Thus, the gradation determining unit 110 determines whether each pixel represents an artificial image, for example.

The dynamic range determining unit 112 determines whether each pixel represents an artificial image by using the third determination criterion. The dynamic range determining unit 112 determines whether the current pixel is included in an artificial image area on the basis of a dynamic range of gradation values of neighboring pixels included in the predetermined area.

Figure 5:
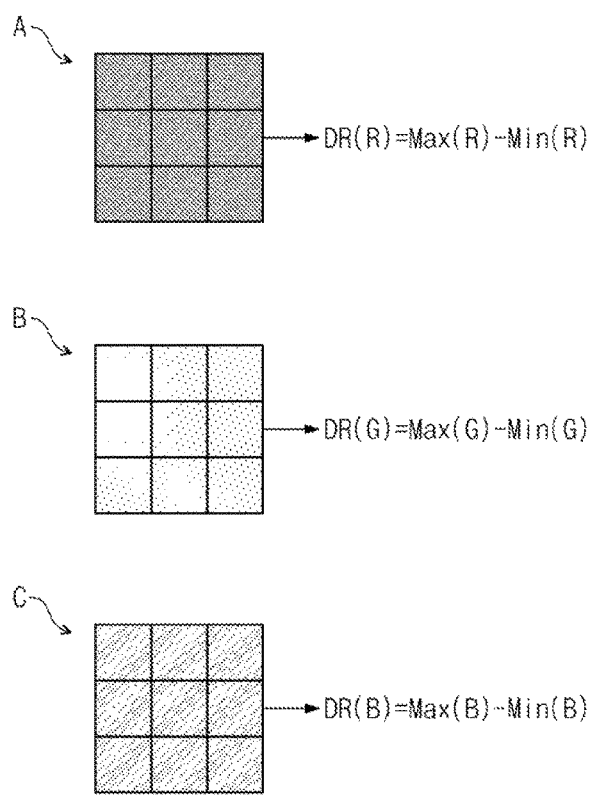
FIG. 5 is a conceptual diagram for explaining an exemplary process of a dynamic range determining unit according to an exemplary embodiment of the inventive concept.

Turning to FIG. 5, a conceptual diagram for explaining an exemplary process of the dynamic range determining unit 112 of FIG. 2 is provided according to an exemplary embodiment of the inventive concept.

FIG. 5 represents a case where the pixel difference determining unit 108 of FIG. 2 calculates a dynamic range for each of the three primary colors of light on the basis of a color signal corresponding to an input image signal. In FIG. 5, only, reference letter A corresponds to red, reference letter B corresponds to green, and reference letter C corresponds to blue.

The dynamic range determining unit 112 determines whether each pixel represents an artificial image, for example, according to steps (C-1) to (C-3) below.

In step (C-1), the dynamic range determining unit 112 extracts, as a predetermined area, for example, a 3×3 pixel area with the current pixel taken as the center.

In addition, when extraction of the predetermined area corresponding to the current pixel is not available, the dynamic range determining unit 112 determines a corresponding pixel not to be an artificial image, and outputs "0" to indicate a non-artificial image.

In step (C-2), the dynamic range determining unit 112 calculates a dynamic range for each of the three primary colors on the basis of a color signal corresponding to the input image signal for each predetermined area corresponding to each pixel. The dynamic range determining unit 112 calculates a dynamic range for each of the three primary colors according to Equation (1), below.

Here, "DR(R)" in Equation (1) is a dynamic range corresponding to red, and "Max(R)" and "Min(R)" in Equation (1) represent maximum and minimum values of gradation for the neighboring pixels on the basis of a color signal corresponding to red. In addition, "DR(G)" in Equation (1) is a dynamic range corresponding to green, and "Max(G)" and "Min(G)" in Equation (1) represent maximum and minimum values of gradation for the neighboring pixels on the basis of a color signal corresponding to green. It follows that "DR(B)" in Equation (1) is a dynamic range corresponding to blue, and "Max(B)" and "Min(B)" in Equation (1) represent maximum and minimum values of gradation for the neighboring pixels on the basis of a color signal corresponding to blue.

$$\begin{cases} DR(R) = \text{Max}(R) - \text{Min}(R) \\ DR(G) = \text{Max}(G) - \text{Min}(G) \\ DR(B) = \text{Max}(B) - \text{Min}(B) \end{cases} \quad \text{Equation (1)}$$

In step (C-3), the dynamic range determining unit 112 determines that a current pixel corresponding to the predetermined area represents an artificial image by using the three calculated dynamic ranges for each predetermined area corresponding to each pixel, when it is determined that only any one color among the three primary colors has a larger change and the other two colors have small changes, or that only any one color among the three primary colors has a smaller change and the other two colors have large changes. In addition, the dynamic range determining unit 112 outputs "1" to indicate the artificial image.

In detail, the dynamic range determining unit 112 determines that only any one color among the three primary colors has a larger change and the other two colors have small changes when only one of the three calculated dynamic ranges is equal to or greater than a seventh threshold value, or alternatively when only one dynamic range is greater than the seventh threshold value, and the other two dynamic ranges are equal to or smaller than an eighth threshold value, or alternatively the other two dynamic ranges are smaller than the eighth threshold value. Alternatively, the dynamic range determining unit 112 determines that only any one color among the three primary colors has a smaller change and the other two colors have large changes when two of the three calculated dynamic ranges are equal to or greater than the seventh threshold value, or alternatively only two dynamic ranges are greater than the seventh threshold value, and another dynamic range is equal to or smaller than the eighth threshold value, or alternatively another dynamic range is smaller than the eighth threshold value.

Here, the seventh threshold value may be "100/255" (e.g., an example of the seventh threshold value in a case where a gradation value is represented with 8 bits), and the eighth threshold value may be "1/255" (e.g., an example of the eighth threshold value in a case where a gradation value is represented with 8 bits). In addition, the seventh and eighth threshold values according to an exemplary embodiment of the inventive concept are not limited thereto. The seventh and eighth threshold values may be preset fixed values, or variable values that may be varied by manipulation of the image processing device 100.

In addition, the dynamic range determining unit 112 determines that a pixel corresponding to the predetermined area does not represent an artificial image by using the three calculated dynamic ranges for each predetermined area corresponding to each pixel, when it is determined that only any one color among the three primary colors has a larger change and the other two colors have small changes, or only any one color among the three primary colors has a smaller change and the other two colors have large changes. In addition, the pixel difference determining unit 112 outputs "0" to indicate a non-artificial image. Thus, the dynamic range determining unit 112 determines an artificial image for each pixel, for example, according to steps (C-1) to (C-3).

The artificial image degree generating unit 114 generates or determines an artificial image degree, which is an example of a determination result for an artificial image, on the basis of a function or logical combination of results determined with the pixel difference determining unit 108, gradation determining unit 110, and dynamic range determining unit 112.

The artificial image degree generating unit 114 performs a function or logical combination on the determination results. The artificial image degree generating unit 114 allocates a maximum value of the artificial image degree representing a degree of the extent to which an image is artificial for the pixel determined to represent the artificial image. In addition, the artificial image degree generating unit 114 allocates a minimum value of the artificial image degree for a pixel not determined to represent the artificial image. In addition, the artificial image degree generating unit 114 determines an artificial image degree for each pixel by performing spatial-filtering on a plurality of pixels to which artificial image degrees are allocated. In addition, the artificial image degree generating unit 114 may take, as the artificial image degree, the result of a function or logical combination of the determination results.

Figure 6:
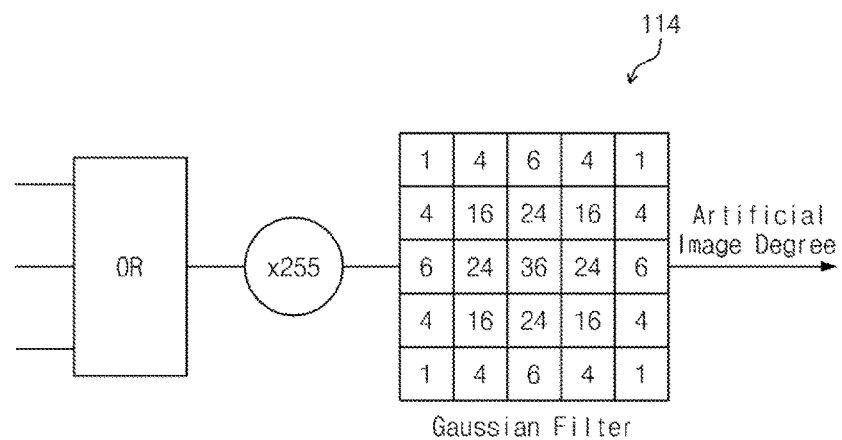
FIG. 6 is a partial schematic and conceptual diagram for explaining an exemplary process of an artificial image degree generating unit according to an exemplary embodiment of the inventive concept.

Turning now to FIG. 6, a diagram is provided for explaining an exemplary process of an artificial image degree generating unit 114 according to a an embodiment of the inventive concept. The artificial image degree generating unit 114 of FIGS. 2 and 6 performs a logical OR operation, which is an example of a function or logical combination of the determination results, on the determination results of the pixel difference determining unit 108, gradation determining unit 110, and dynamic range determining unit 112.

In addition, as described above, a function or logical combination according to an exemplary embodiment of the inventive concept is not limited to the logical OR operation of the determination results. For example, the artificial image degree generating unit 114 may perform a logical AND and/or other logical operation on the determination results of the pixel difference determining unit 108, gradation determining unit 110, and dynamic range determining unit 112.

When performing the logical OR operation on the determination results, the artificial image degree generating unit 114 multiplies the function or logical combination of the determination results by a value corresponding to the maximum value of the artificial image degree.

FIG. 6 illustrates an example where the function or logical combination of the results determined with "255" (e.g., an exemplary maximum value of the artificial image degree for a case where the input image signal is represented with 8 bits). In addition, a value corresponding to the maximum value of the artificial image degree according to an exemplary embodiment of the inventive concept is not limited to "255" on a scale of 0 to 255, and may be another value such as "256" on a scale of 1 to 256. The value corresponding to the maximum value of the artificial image degree according to an exemplary embodiment of the inventive concept may be a preset fixed value, or a variable value that may be varied by manipulation of the image processing device 100.

The artificial image degree generating unit 114 generates an artificial image degree for each pixel by performing spatial-filtering on a plurality of pixels to which artificial image degrees are allocated. The artificial image degree generating unit 114 generates or determines an artificial image degree of the current pixel by performing spatial-filtering on a 5×5 pixel area around the current pixel with a Gaussian filter. In addition, when the 5×5 pixel area corresponding to the current pixel is not reachable or settable, the artificial image degree generating unit 114 takes, as the artificial image degree, the function or logical combination of the determination results.

The artificial image degree generating unit 114 may generate the artificial image degree level-wise, such as, for example, with 256 levels by performing spatial-filtering using the foregoing Gaussian filter.

The artificial image degree generating unit 114 generates an artificial image degree, which is an example of a determination result for an artificial image, on the basis of, for example, a function or logical combination of results determined by the pixel difference determining unit 108, gradation determining unit 110, and dynamic range determining unit 112.

In addition, the process executed by the artificial image degree generating unit 114 is not limited to the examples described above. For example, the artificial image degree generating unit 114 may perform spatial-filtering by using another filter such as an average filter, instead of the Gaussian filter illustrated in FIG. 6. In addition, the artificial image degree generating unit 114 may perform spatial-filtering on another area such as a 3×3 pixel or a 7×7 pixel area rather than the 5×5 pixel area.

The artificial image determining unit 102 of FIGS. 1 and 2 determines whether each pixel represents the artificial image on the basis of the input image signal. In addition, a configuration of the artificial image determining unit 102 according to the first embodiment is not limited to the configuration illustrated in FIG. 2.

For example, the artificial image determining unit 102 need not include one of the pixel difference determining unit 108, gradation determining unit 110, and dynamic range determining unit 112. In addition, the artificial image determining unit 102 may further include one or more determining units for determining whether each pixel represents the artificial image according to another determination condition, which is different from the first determination criterion of pixel difference described above with respect to unit 108, the second determination of gradation described above with respect to unit 110. or the third determination criterion of dynamic range described above with respect to unit 112. Alternatively, while retaining one or more determining units 108, 110 or 112, the artificial image determining unit 102 may have a configuration where one or two of the pixel difference determining unit 108, gradation determining unit 110, and dynamic range determining unit 112 illustrated in FIG. 2 are omitted in favor of at least one alternate embodiment second determining unit.

The natural image processing unit 104 of FIG. 2 performs a first image process on the input image signal. The first image process according to an exemplary embodiment of the inventive concept may include various image processes such as an edge enhancement process, a color area conversion process, and a contrast correction process. In addition, the first image process according to an exemplary embodiment of the inventive concept does not include a magnification process. An exemplary embodiment of the present inventive concept may comprise an image process including a magnification process.

Figure 7:
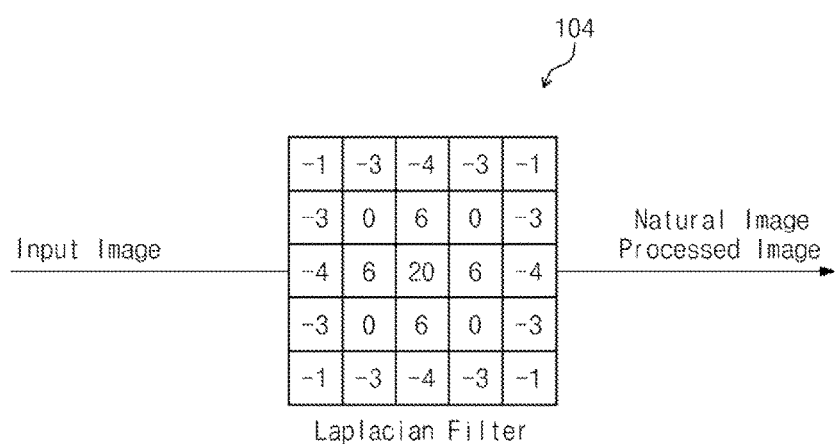
FIG. 7 is a partial schematic and conceptual diagram for explaining an exemplary process of a natural image processing unit according to an exemplary embodiment of the inventive concept.

As shown in FIG. 7, a diagram is provided for explaining an exemplary process performed by the natural image processing unit 104 of FIGS. 1 and 7 according to an embodiment of the inventive concept, and shows an example of the edge enhancement process. Here, for convenience, an image after processing by the natural image processing unit 104 is represented as a natural image processed image.

The natural image processing unit 104 of FIGS. 1 and 7 performs a filtering process on an input image signal by applying a Laplacian filter. The natural image processing unit 104 adds or subtracts a Laplacian filter-applied result to or from the input image signal as a gain. In addition, a filtering process using another edge enhancement filter other than the Laplacian filter may also be performed by the natural image processing unit 104. The edge enhancement filter according to an exemplary embodiment of the present disclosure may be a linear filter or a non-linear filter.

The synthesizing unit 106 of FIG. 1 may perform image processing based on the determination result obtained from the artificial image determination process, and synthesize the input image signal and an image signal on which the first image process is performed by the natural image processing unit 104 on the basis of the determination result of the artificial image determining unit 102.

The synthesizing unit 106 performs an exemplary operation of Equation (2), below, on each pixel. Equation (2) is an example of the operation performed by the synthesizing unit when the input image signal is represented with 8 unsigned bits.

In a first embodiment, "$R_{arl}$", "$G_{arl}$", and "$B_{arl}$" of Equation (2) are gradation values represented by a color signal corresponding to the input image signal. In Equation (2), "bld" represents the artificial image degree. In addition, "$R_{natural}$", "$G_{natural}$", and "$B_{natural}$" are gradation values represented by a color signal corresponding to an input image signal on which the first image process is performed. "$R_{bld}$", "$G_{bld}$", and "$B_{bld}$" of Equation (2) are gradation values represented by a color signal corresponding to an output image signal.

$$\begin{cases} R_{bld} = \dfrac{R_{natural} \times (255 - bld) + R_{arl} \times bld}{255} \\ G_{bld} = \dfrac{G_{natural} \times (255 - bld) + G_{arl} \times bld}{255} \\ B_{bld} = \dfrac{B_{natural} \times (255 - bld) + R_{arl} \times bld}{255} \end{cases} \quad \text{Equation (2)}$$

The image processing device 100 according to the first embodiment of the inventive concept has the exemplary configuration illustrated in FIG. 1. Here, the image processing device 100 performs an artificial image determination process according to an exemplary embodiment of the inventive concept in the artificial image determining unit 102. Accordingly, the image processing device 100 may determine whether an image of each pixel is artificial or natural on the basis of the input image signal with, for example, the configuration illustrated in FIG. 1.

In addition, the image processing device 100 synthesizes, through the synthesizing unit 106, the input image signal and an image signal on which the first image process is performed on the basis of the determination result of the artificial image determining unit 102. Here, an image having high sharpness may be obtained by enhancing the texture for an edge (e.g., at a lawn or grass border included in an input image) of a natural image and generating an overshoot or undershoot.

Furthermore, for example, when the edge is enhanced in an artificial image such as a character generated by a computer or a line, ringing may occur. Since the ringing may be recognized as an artifact, there is a possibility that the display quality would be degraded. Therefore, it is better not to enhance an edge by outputting the input image without any process executed thereon for at least a portion of the artificial image included in the input image.

The image processing device 100 synthesizes, through the synthesizing unit 106, the input image signal and an image signal on which the first image process has been performed on the basis of a plurality of levels of the artificial image degree (e.g., the artificial image degree of 256 levels), which are the determination result of the artificial image determining unit 102. Accordingly, a degradation of display quality as in the foregoing may be prevented and an artifact will not occur at an interface portion of the natural image with the artificial image. Accordingly, the image processing device 100 may enhance the display quality of an output image with the configuration illustrated in FIG. 1.

In addition, a configuration of the image processing device according to a first embodiment is not limited to the configuration illustrated in FIG. 2. For example, the image processing device according to the first embodiment may further include an artificial image processing unit for performing an image process on an artificial image. When the artificial image processing unit is further included, the synthesizing unit 106 may synthesize the image signal on which the first image process is performed by the natural image processing unit 104, and the image signal on which the image process is performed by the artificial image processing unit.

In addition, the process may be performed in an associated manner with one or more external devices or an external processing circuit having the same function as that of at least one of the natural image processing unit 104 and the synthesizing unit 106. In this case, the image processing device may also have a configuration where any one or both of the natural image processing unit 104 and the synthesizing unit 106 may be omitted.

Even when any one or both of the natural image processing unit 104 and the synthesizing unit 106 are omitted, the image processing device according to the first embodiment may perform the artificial image determination process according to embodiments of the presently disclosed inventive concept. Even when any one or both of the natural image processing unit 104 and the synthesizing unit 106 are omitted, the image processing device according to the first embodiment may determine whether an image for each pixel is artificial or natural on the basis of the input image signal.

In a second embodiment image processing device, the image processing device according to this embodiment of the inventive concept is not limited to the image processing device according to the first embodiment. For the image processing device according to the second embodiment, a description will be provided with respect to an example of a configuration of an image processing device capable of outputting an output image where the input image is magnified.

As an extension of the input image according to the second embodiment, the input image may be doubly magnified in the horizontal and vertical directions, namely, four times, like the extension of an image having a full high definition (FHD) resolution to an ultra high definition (UHD). In addition, the magnification of the input image according to the second embodiment is not limited to the foregoing example, and the image processing device according to the second embodiment may magnify the input image by an arbitrary available magnification.

Figure 8:
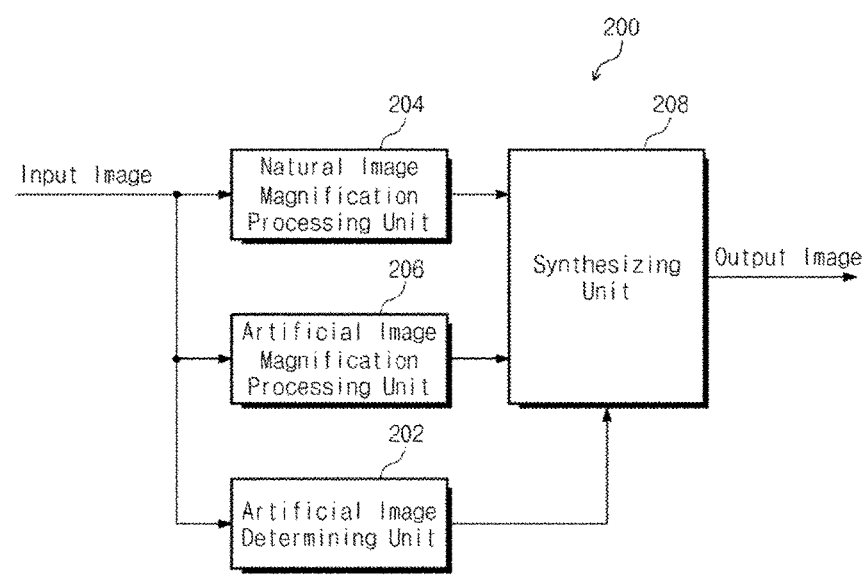
FIG. 8 is a block diagram illustrating an exemplary configuration of an image processing device according to an exemplary embodiment of the inventive concept.

Turning to FIG. 8, an image processing device according to another exemplary embodiment of the inventive concept is indicated generally by the reference numeral 200. Here, an input image signal is represented as an Input Image and an image signal after processing is represented as an Output Image, similar to the image processing device 100 of FIG. 1.

The image processing device 200 includes three processing units including an artificial image determining unit 202 connected to the input image signal, a natural image magnification processing unit 204 connected to the input image signal, and an artificial image magnification processing unit 206 connected to the input image signal, as well as a synthesizing unit 208 connected to the outputs of the three units 202, 204 and 206.

The image processing device 200 may be configured with a processor such as a CPU or various processing circuits, similar to the image processing device 100 illustrated in FIG. 1. The image processing device 200 may alternately include a controller for controlling the entirety thereof. When the image processing device 200 includes a controller, the controller may implement the artificial image determining unit 202, the natural image magnification processing unit 204, the artificial image magnification processing unit 206, and the synthesizing unit 208.

In addition, one or more among the artificial image determining unit 202, the natural image magnification processing unit 204, the artificial image magnification processing unit 206, and the synthesizing unit 208 may be realized by a processing circuit, such as a dedicated or general-purpose processing circuit, separate from the controller. In addition, by one or more of the artificial image determining unit 202, the natural image magnification processing unit 204, the artificial image magnification processing unit 206, and the synthesizing unit 208, the process may be implemented by a program storage device with software executed by a processor or the like.

The artificial image determining unit 202 performs the artificial image determining process. The artificial image determining unit 202 determines whether an artificial image is present in the input image signal by using each of two or more different determination criteria. The artificial image determining unit 202 performs a function or logical combination of the results determined under two or more determination criteria, and on the basis of the determination result, determines whether an artificial image is present in the input image signal for each pixel. In addition, the artificial image determining unit 202 outputs, for example, an artificial image degree for each pixel as the result of determining whether each pixel represents an artificial image.

Figure 9:
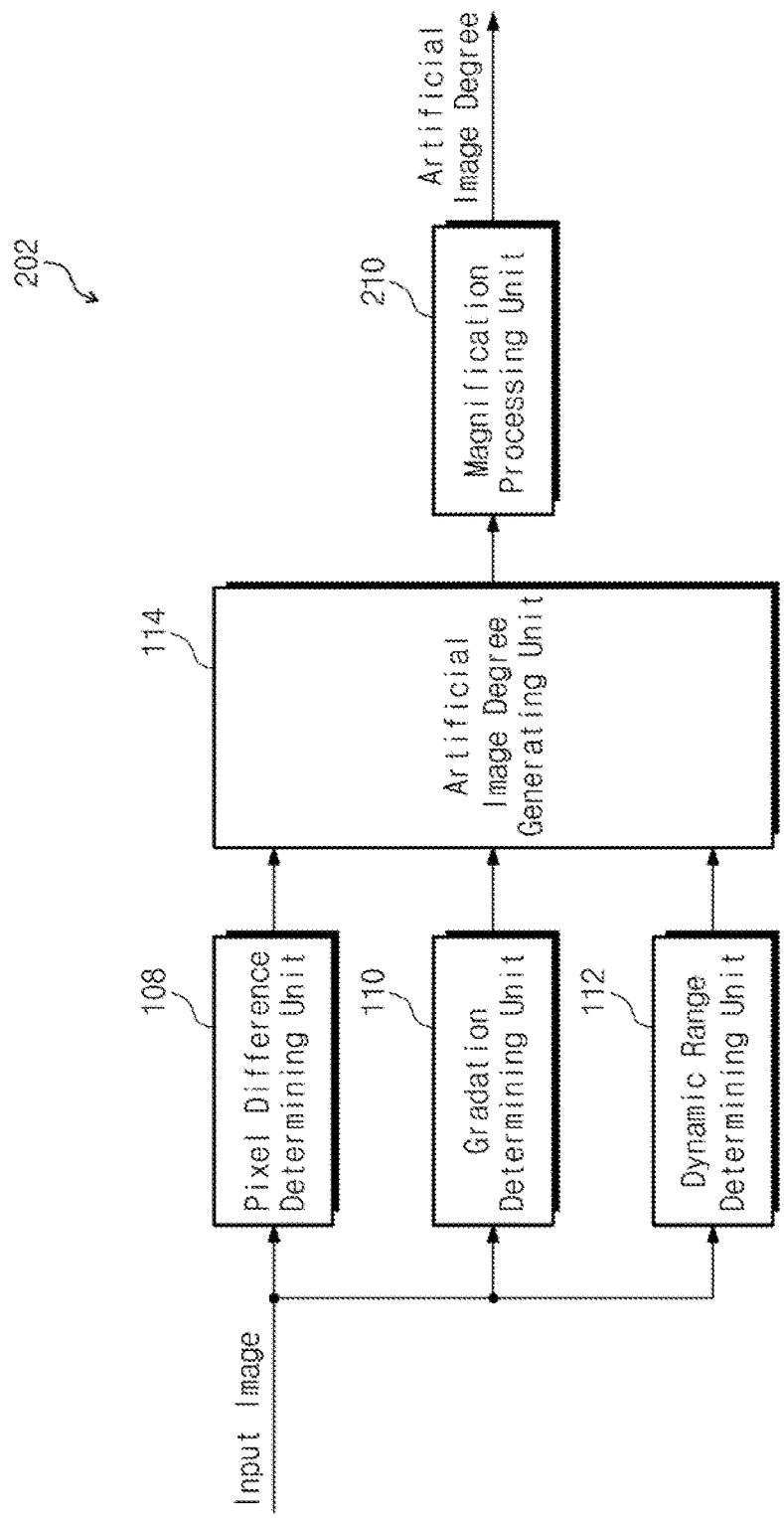
FIG. 9 is a block diagram illustrating an exemplary configuration of an artificial image determining unit according to an exemplary embodiment of the inventive concept.

Turning now to FIG. 9, an artificial image determining unit according to an exemplary embodiment of the inventive concept is indicated generally by the reference numeral 202. The artificial image determining unit 202 may include a pixel difference determining unit 108 connected to the input image signal, a gradation determining unit 110 connected to the input image signal, a dynamic range determining unit 112 connected to the input image signal, an artificial image degree generating unit 114 connected to each of the units 108, 110 and 112, and a magnification processing unit 210 connected to the unit 114.

Comparing the artificial image determining unit 202 illustrated in FIG. 9 with the artificial image determining unit 102 according to the embodiment illustrated in FIG. 2, the artificial image determining unit 202 further includes the magnification processing unit 210. To avoid duplicate description, only the magnification processing unit 210 forming a part of the artificial image determining unit 202 will now be described.

The magnification processing unit 210 further performs a magnification process for the artificial image determination result. The magnification process that the magnification processing unit 210 performs on the artificial image degree is an example of an artificial image determination result. For each pixel output from the artificial image degree generation unit 114, a process is performed according to an arbitrary method capable of magnifying an image, such as, for example, a nearest neighbor method, a bi-linear method, or a bi-cubic method, without limitation.

Figure 10:
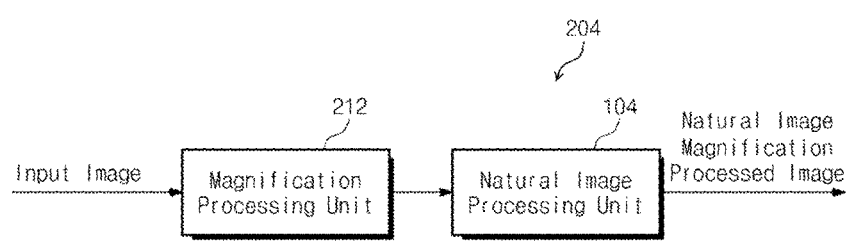
FIG. 10 is a block diagram illustrating an exemplary configuration of a natural image magnification processing unit according to an exemplary embodiment of the inventive concept.

The natural image magnification processing unit 204 of FIGS. 8 and 10 performs another image process including the magnification process on the input image signal. The second image process according to this exemplary embodiment of the inventive concept may include a process where the first image process according to the first embodiment is combined with the magnification process.

An exemplary embodiment of the present inventive concept may, but need not, perform a clip process. When a clip process is performed on a portion of the natural image included in the image, the portion may stand out, for example, or may look like a recoated oil painting.

As shown in FIG. 10, a natural image magnification processing unit according to another embodiment of the inventive concept is indicated generally by the reference numeral 204. The natural image magnification processing unit 204 includes an input image signal connected to a magnification processing unit 212, which, in turn, is connected to a natural image processing unit 104 that outputs a natural image magnification processed image signal.

The magnification processing unit 212 performs a magnification process on the input image signal. The magnification processing unit 212 may perform a process for magnifying an image by using the nearest neighbor method, bi-linear method, bi-cubic method, or the like, but is not limited thereto. The natural image processing unit 104 performs, on an image signal (i.e., the image signal where the magnification process has been performed on the input image signal), received from the magnification processing unit 212, a first image process such as an edge enhancement process, in the natural image processing unit 104, much like the embodiment of FIG. 1. When the edge enhancement process is performed in the natural image processing unit 104, a blur phenomenon occurring during the magnification may be diminished. In FIG. 10, for convenience, an image after the process performed by the natural image processing unit 104 is represented as a natural image magnification processed image.

In addition, the configuration of the natural image magnification processing unit 204 is not limited to the example illustrated in FIG. 10. Alternatively, for example, the natural image magnification unit 204 may include the magnification processing unit 212 behind the natural image processing unit 104.

Figure 11:
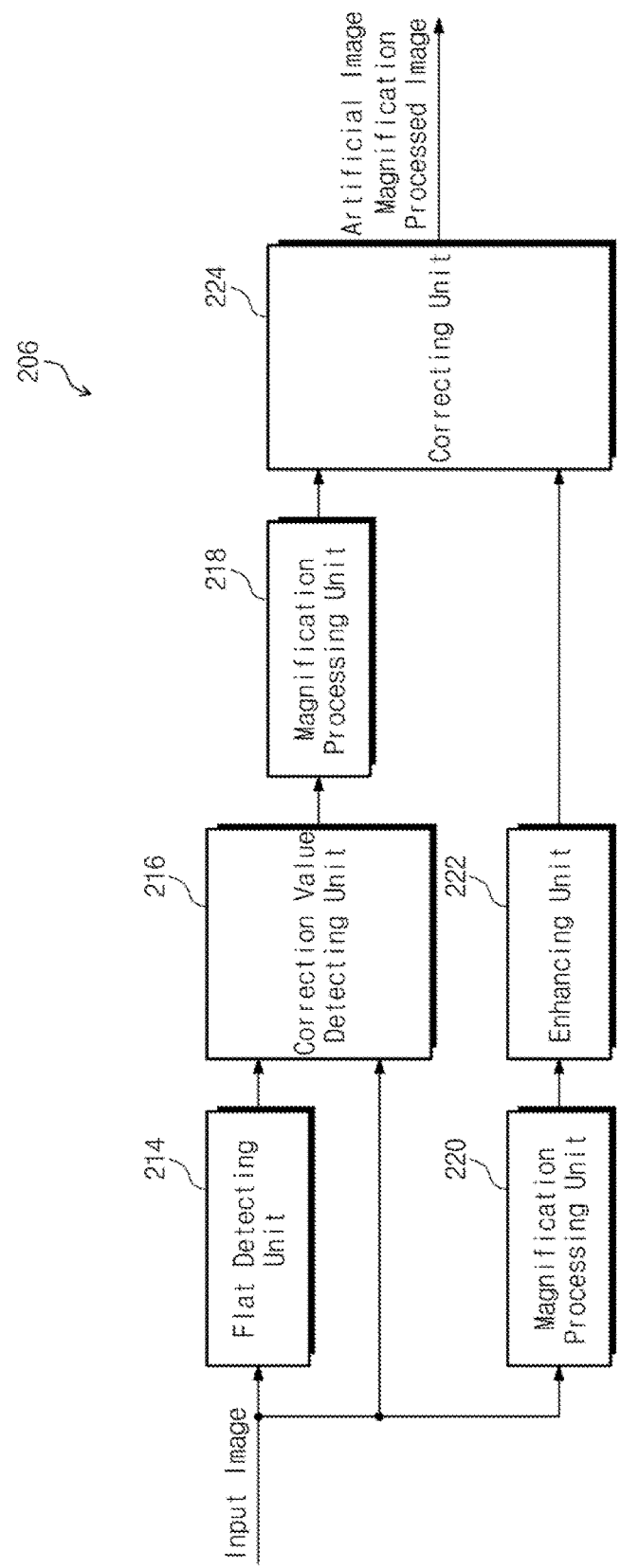
FIG. 11 is a block diagram illustrating an exemplary configuration of an artificial image magnification processing unit according to an exemplary embodiment of the inventive concept.

Turning to FIG. 11, the artificial image magnification processing unit 206 of FIG. 8 is shown in greater detail. Here, the unit 206 performs a third image process, which is different from the second image process, including a magnification process and an edge enhancement process on the input image signal. The artificial image magnification processing unit 206 performs the edge enhancement process for diminishing the blur phenomenon occurring during the magnification. When the edge enhancement process is performed on the artificial image, an overshoot or an undershoot may be noticeable. Accordingly, the artificial image magnification processing unit 206 may perform a clip process so the overshoot or undershoot is not generated.

The artificial image magnification processing unit 206 determines whether a current pixel is included in a flat area on the basis of a pixel value of the current pixel and pixel values of neighboring pixels. The artificial image magnification unit 206 sets, for each pixel, at least any one of a lowest correction limit value and a highest correction limit value according to the determination result. In addition, the artificial image magnification processing unit 206 clips an image signal on which the magnification and edge enhancement processes are performed with at least any one of the lowest correction limit value and the highest correction limit value.

Hereinafter, a process by the artificial image magnification processing unit 206 will be described in detail by exemplifying a case where the clip is performed with both the lowest correction limit value and the highest correction limit value. In addition, there are several cases where the lowest correction limit value and the highest correction limit value are collectively called a "correction value".

The artificial image magnification processing unit 206 includes a flatness detecting unit 214 for receiving an input image, a correction value calculating unit 216 connected to the unit 214, a magnification processing unit 218 connected to the unit 216, a magnification processing unit 220 for receiving the input image, an enhancing unit 222 connected to the unit 220, and a correcting unit 224 connected to both the units 218 and 222 for outputting an artificial image magnification processed image. Here, the flatness detecting unit 214 determines whether a current pixel is included in a pixel-wise flat area on the basis of a pixel value of the current pixel and pixel values of neighboring pixels.

Figure 12:
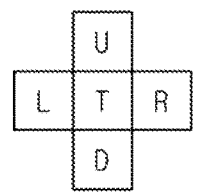
FIG. 12 is a conceptual diagram for explaining an exemplary process of the artificial image magnification processing unit according to an exemplary embodiment of the inventive concept.

Turning now to FIG. 12, a diagram is provided for explaining an exemplary process of the artificial image magnification processing unit 206 according to an embodiment of the inventive concept. Here, "T" represents a current pixel. In addition, "L" represents a neighboring pixel around the current pixel at the left in the horizontal direction of the image, and "R" represents a neighboring pixel around the current pixel at the right in the horizontal direction of the image. Further, "U" represents a neighboring pixel around the current pixel at the upper side in the vertical direction of the image, and "D" represents a neighboring pixel around the current pixel at the lower side in the vertical direction of the image. The flatness detecting unit 214 performs an operation of the following Equation (3) on each of four neighboring pixels L, R, U and D. Here, "*" in Equation (3) represents any one of neighboring pixels "L", "R", "U", and "D" of FIG. 12. In addition, "$R_T$", "$G_T$", and "$B_T$" are gradation values for the current pixel represented by a color signal corresponding to the input image signal, and "R*", "G*", and "B*" are gradation values of the neighboring pixel represented by a color signal corresponding to the input image signal.

In addition, "Th" in the following Equation (3) is a threshold value for determining whether the current pixel is included in the flat area. The "Th" in Equation (3) may be, for example, "3". The "Th" in Equation (3) may be a preset fixed value, or a variable value that may be varied by manipulation of the image processing device 100.

$$Flat_* = \begin{cases} 1, & |R_T - R_*| + |R_T - R_*| + |R_T - R_*| \leq Th \\ 0, & |R_T - R_*| + |R_T - R_*| + |R_T - R_*| > Th \end{cases} \quad \text{Equation (3)}$$

The flatness detecting unit 214 of FIG. 11 determines whether the current pixel is included in the flat area by performing an operation of Equation (4). Here, when a value of "DetFlat" in Equation (4) is "1", the current pixel is included in the flat area, and when a value of "DetFlat" is "0", the current pixel is not included in the flat area.

$$DetFlat = \begin{cases} 1, & Flat_U + Flat_D + Flat_L + Flat_R \geq 1 \\ 0, & Flat_U + Flat_D + Flat_L + Flat_R = 0 \end{cases} \quad \text{Equation (4)}$$

The flatness detecting unit 214 determines whether the current pixel is included in the flat area. In addition, when the current pixel does not have four neighboring pixels, the flatness detecting unit 214 may determine that the corresponding pixel is not included in the flat area.

The correction value detecting unit 216 sets a correction value (e.g., any one or all of the lowest and highest correction limit values). Hereinafter, a description is provided for the case where the correction value calculating unit 216 sets both the lowest and highest correction limit values.

The correction value calculating unit 216 selects a maximum and minimum value of pixel values for four neighboring pixels neighboring the current pixel at the up, down, right, and left sides.

Hereinafter, for the neighboring pixels, "$R_{max}$" represents a maximum pixel value corresponding to a red color signal, "$G_{max}$" represents a maximum pixel value corresponding to a green color signal, and "$B_{max}$" represents a maximum pixel value corresponding to a blue color signal. Hereinafter, for the neighboring pixels, "$R_{min}$" represents a minimum pixel value corresponding to a red color signal, "$G_{min}$" represents a minimum pixel value corresponding to a green color signal, and "$B_{min}$" represents a minimum pixel value corresponding to a blue color signal.

In addition, the correction value detecting unit 216 sets the lowest and highest correction limit values according to, for example, the following Equations (5) to (10).

Here, "$R_{c\_max}$", "$G_{c\_max}$", and "$B_{c\_max}$" in Equations (5) to (7) are the highest correction limit values, each of which corresponds to a color signal of the input image signal. "$R_{c\_min}$", "$G_{c\_min}$", and "$B_{c\_min}$" in Equations (8) to (10) are the lowest correction limit values, each of which corresponds to a color signal in the input image signal.

$$R_{c\_max} = \begin{cases} R_T, & DetFlat = 1 \\ R_{max}, & DetFlat = 0 \end{cases} \quad \text{Equation (5)}$$

$$G_{c\_max} = \begin{cases} G_T, & DetFlat = 1 \\ G_{max}, & DetFlat = 0 \end{cases} \quad \text{Equation (6)}$$

$$B_{c\_max} = \begin{cases} B_T, & DetFlat = 1 \\ B_{max}, & DetFlat = 0 \end{cases} \quad \text{Equation (7)}$$

$$R_{c\_min} = \begin{cases} R_T, & DetFlat = 1 \\ R_{min}, & DetFlat = 0 \end{cases} \quad \text{Equation (8)}$$

$$G_{c\_min} = \begin{cases} G_T, & DetFlat = 1 \\ G_{min}, & DetFlat = 0 \end{cases} \quad \text{Equation (9)}$$

$$B_{c\_min} = \begin{cases} B_T, & DetFlat = 1 \\ B_{min}, & DetFlat = 0 \end{cases} \quad \text{Equation (10)}$$

The magnification processing unit 218 performs a magnification process for the correction value set for each pixel. The magnification processing unit 218 performs, as the magnification process, a process according to an arbitrary method capable of magnifying an image according to the nearest neighbor method, bi-linear method, or bi-cubic method, but is not limited thereto.

The magnification processing unit 220 performs the magnification process on the input image signal. The magnification processing unit 220 performs, as the magnification process, a process according to an arbitrary method capable of magnifying an image according to the nearest neighbor method, bi-linear method, or bi-cubic method, but is not limited thereto. The enhancing unit 222 performs an edge enhancement process.

Figure 13:
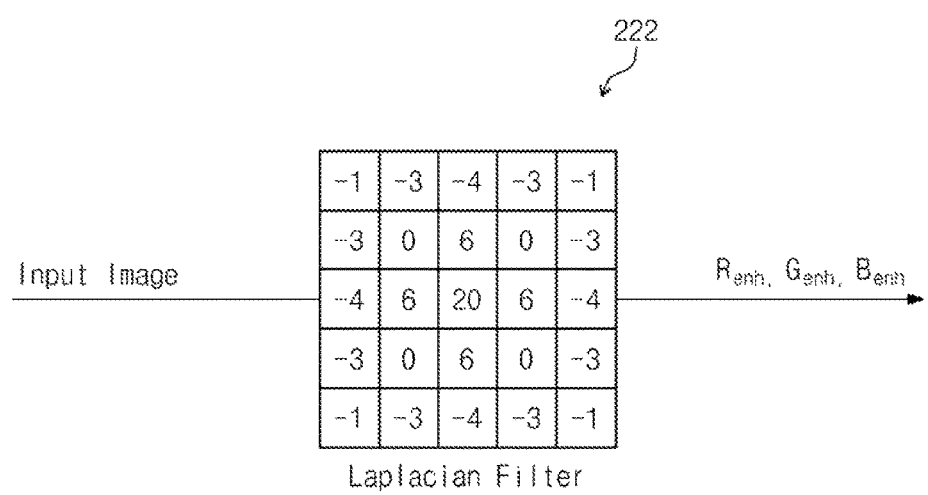
FIG. 13 is a partial schematic and conceptual diagram for explaining an exemplary process of the artificial image magnification processing unit according an exemplary embodiment of the inventive concept.

As shown in FIG. 13, an enhancing unit is indicated generally by the reference numeral 222. This diagram is provided for explaining an exemplary process of the artificial image magnification processing unit 206 of FIGS. 8 and 11 according to an embodiment of the inventive concept. Here, the enhancing unit 222 is used for configuring the artificial image magnifying unit 206. In FIG. 13, "$R_{enh}$" represents a gradation value or example of pixel value represented by a color signal corresponding to red, for which the enhancement process is performed, "$G_{enh}$" represents a gradation value or example of pixel value represented by a color signal corresponding to green, for which the enhancement process is performed, and "$B_{enh}$" represents a gradation value or example of pixel value represented by a color signal corresponding to green, for which the enhancement process is performed.

The enhancing unit 222 performs a filtering process using a Laplacian filter on the input image signal and adds or subtracts, as a gain, a Laplacian filter-applied result to or from the input image signal. In addition, a filter process using another edge enhancement filter other than the Laplacian filter may also be performed by the enhancing unit 222.

The correcting unit 224 of FIG. 11 clips an image signal for which the magnification and edge enhancement process are performed by the magnification processing unit 220 and the enhancing unit 222 to clip with a correction value (e.g., the lowest and highest correction limit values). For example, in a case where the clip is performed with both the lowest and highest correction limit values, the correcting unit 224 clips the image signal for which the magnification and edge enhancement processes are performed with the correction value by performing an operation of the following Equations (11) to (13).

Here, "$R_{clip}$", "$G_{clip}$", and "$B_{clip}$" in Equations (11) to (13) are gradation values or pixel values after correction, which respectively correspond to the color signals in the input image signal.

$$R_{clip} = \begin{cases} R_{c\_max}, & R_{c\_max} < R_{enh} \\ R_{enh}, & R_{c\_min} \le R_{enh} \le R_{c\_max} \\ R_{c\_min}, & R_{enh} < R_{c\_min} \end{cases} \quad \text{Equation (11)}$$

$$G_{clip} = \begin{cases} G_{c\_max}, & G_{c\_max} < G_{enh} \\ G_{enh}, & G_{c\_min} \le G_{enh} \le G_{c\_max} \\ G_{c\_min}, & G_{enh} < G_{c\_min} \end{cases} \quad \text{Equation (12)}$$

$$B_{clip} = \begin{cases} B_{c\_max}, & B_{c\_max} < B_{enh} \\ B_{enh}, & B_{c\_min} \le B_{enh} \le B_{c\_max} \\ B_{c\_min}, & B_{enh} < B_{c\_min} \end{cases} \quad \text{Equation (13)}$$

The artificial image magnification processing unit 206 of FIG. 11 performs, as the third image process, a clip process for clipping, with one or both of the lowest and highest correction limit values, an image signal on which a magnification process, an edge enhancement process, and/or magnification and edge enhancement processes are performed. In addition, the configuration of the artificial image magnification processing unit 206 is not limited to the configuration illustrated in FIG. 11.

Referring back to FIG. 8, a description will be provided for an exemplary configuration of the image processing device 200 according to the second embodiment. The synthesizing unit 208 synthesizes an image signal on which the second image process is performed by the natural image magnification processing unit 204, and an image signal on which the third image process is performed by the artificial image magnification processing unit 206 on the basis of the determination result of the artificial image determining unit 202 (e.g., where the magnification process is performed in addition to a process by the artificial image determining unit 102 in FIG. 1).

The synthesizing unit 208 synthesizes the image signal on which the second image process is performed and the image signal on which the third image process is performed by performing an operation in Equation (2) for each pixel. When the synthesizing unit 208 performs the operation of Equation (2), "$R_{art}$", "$G_{art}$", and "$B_{art}$" in Equation (2) are gradation values or an example of pixel values represented by a color signal corresponding to the image signal on which the third image process is performed by the artificial image magnification processing unit 206. The image processing device 200 according to the second embodiment has, for example, the configuration illustrated in FIG. 8.

The image processing device 200 performs an artificial image determination process with the artificial image determining unit 202 according to an exemplary embodiment of the inventive concept. Accordingly, the image processing device 200 may determine whether an image of each pixel is artificial or natural on the basis of the input image signal with, for example, the configuration illustrated in FIG. 8.

The synthesizing unit 208 synthesizes the image signal on which the second image process is performed and the image signal on which the third image process is performed on the basis of the determination result of the artificial image determining unit 202.

As described above, an image having high sharpness may be obtained by enhancing an edge and generating the overshoot or undershoot in the texture of the natural image. In addition, since a blur phenomenon may occur by the magnification process, the image processing device 200 may perform the edge enhancing process on an artificial image, such as characters generated by a computer or the like, to diminish the blur phenomenon, As described above, when the edge is enhanced in the artificial image, a ringing may occur. However, the image processing device 200 may prevent occurrence of the ringing by clipping the image with the correction value to prevent the occurrence of the overshoot or undershoot.

The synthesizing unit 208 synthesizes the image signal on which the second image process is performed and the image signal on which the third image process is performed on the basis of a plurality of levels of the artificial image degree, such as the artificial image degree of 256 levels, which are the determination result of the artificial image determining unit 202. Accordingly, similar to the image processing device 100 according to the first embodiment of FIG. 1, an artifact may not be generated in an interface portion between the natural image and artificial image in the image processing device 200 according to the second embodiment of FIG. 8.

The image processing device 200 may enhance the display quality of the output image with the configuration illustrated in FIG. 8. In addition, the configuration of the image processing device according to the second embodiment is not limited to the configuration illustrated in FIG. 8.

For example, when the process is performed in an associated configuration with one or more external devices, or an external processing circuit, having the same function as that of one or more of the natural image magnification processing unit 204, the artificial image magnification processing unit 206, and synthesizing unit 208, the image processing device according to the second embodiment may have a configuration where one or more of the natural image magnification processing unit 204, the artificial image magnification processing unit 206, and synthesizing unit 208 are omitted.

Although one or more of the natural image magnification processing unit 204, the artificial image magnification processing unit 206, and the synthesizing unit 208 are omitted in an alternate embodiment, the image processing device according to the second embodiment may still perform the artificial image determining process according to an exemplary embodiment of the inventive concept. In addition, in this case, the image processing device may determine whether an image of each pixel is artificial or natural on the basis of the input image signal.

Although the foregoing exemplary embodiments of the inventive concept have been provided for describing the image processing device by example, alternate embodiments are not limited to these particular types. These and other embodiments of the inventive concept may be applied to various devices capable of processing an image signal, such as a computer including a PC or a server, a device in a tablet type, a communication device including a mobile phone or smartphone, and/or a display device including a TV or monitor, for example. In addition, the embodiments of the inventive concept may be applied to one or more integrated circuits (IC) capable of being assembled.

A predetermined program stored in or for execution by a computer may be executed to function as an image processing device according to an exemplary embodiment of the inventive concept. For example, the program may include artificial image determining program steps corresponding to the artificial image determining unit 102, first image processing program steps corresponding to the natural image processing unit 104, and synthesizing program steps corresponding to the synthesizing unit 106. In addition, the program may enable a computer to function as the image processing device according to a modified example of the first embodiment, like the artificial image determining program steps corresponding to the artificial image determining unit 102.

Similarly, a program storage device may contain a program enabling a computer to function as the image processing device 200 according to the second embodiment, like the artificial image determining program steps corresponding to the artificial image determining unit 202, second image processing program steps corresponding to the natural image magnification processing unit 204, third image processing program steps corresponding to the artificial image magnification processing unit 206, and synthesizing program steps corresponding to the synthesizing unit 208.

The program may be a program enabling computer to function as the image processing device according to a modified example of the second embodiment, like artificial image determining program steps corresponding to the artificial image determining unit 202. Accordingly, as the program is executed, whether an image for each pixel in the input image is artificial or natural may be determined.

In addition, when a program, which enables a computer to function as the image processing device according to an exemplary embodiment of the inventive concept, is executed in the computer, an effect, which is the same as that obtained by using the image processing device according to an exemplary embodiment of the inventive concept, may be provided.

In addition, in the foregoing, embodiments of the inventive concept are described with reference to the accompanying drawings, but are not limited hereto. Accordingly, it shall be understood that numerous other modifications and embodiments may be devised by those of ordinary skill in the pertinent art that will fall within the spirit and scope of the principles of the inventive concept.

For example, in the foregoing, it is proposed that a program, for enabling a computer to function as the image processing device according to an exemplary embodiment of the inventive concept reside on the computer, but the embodiment may alternately provide a separate recording medium with the program recorded thereon.

In exemplary embodiments of the inventive concept, whether an image of each pixel is artificial or natural may be determined on the basis of an input image. The above-disclosed subject matter is to be considered illustrative and not restrictive, and the appended claims are intended to cover all modifications, enhancements, changes and other embodiments, which may be made by those of ordinary skill in the pertinent art without departing from the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An image processing device comprising:
an artificial image determining circuit configured to determine whether an image is artificial by using two or more different determination criteria for determining whether the image is artificial on a basis of an input image signal, and to determine whether an image for each pixel in an input image represented by the input image signal represents an artificial image based on at least one of a function or logical combination of results determined under the determination criteria,
wherein the determination criteria comprise any one or more of:
a first determination criterion for determining whether a current pixel is an artificial image by using pixel values of pixels in a predetermined area in which the current pixel and neighboring pixels around the current pixel are present in a matrix arrangement, and by determining whether the predetermined area represents a flat area;
a second determination criterion for determining whether the current pixel represents the artificial image by using gradation values of the pixels in the predetermined area to determine whether the predetermined area represents a gradation area; and
a third determination criterion for determining whether the current pixel represents the artificial image by determining a color change for each of three primary colors of light in the predetermined area based on a dynamic range of a gradation value of each of the neighboring pixels.

2. The image processing device of claim 1, the artificial image determining circuit comprising a logic circuit having at least one logic gate configured to determine whether an image is artificial using a logical combination of a plurality of the results determined under the determination criteria.

3. The image processing device of claim 1, the artificial image determining circuit comprising a function circuit configured to apply different non-zero weights to a plurality of the results determined under the determination criteria.

4. The image processing device of claim 1, wherein when the determination is performed under the first determination condition, the artificial image determining circuit calculates a first absolute value by taking an absolute value to a difference between a pixel value of the current pixel and a pixel value of each of the neighboring pixels, calculates a first number comprising the first absolute value when the first absolute value is equal to or greater than a first threshold value, and determines that the current pixel represents the artificial image when the first number is smaller than a second threshold value.

5. The image processing device of claim 4, wherein the artificial image determining circuit calculates the first absolute value that is a difference between pixel values of pixels neighboring in a horizontal direction and in a vertical direction of the input image.

6. The image processing device of claim 4, wherein the artificial image determining circuit calculates the first absolute value for each of three primary colors of light on a basis of a color signal corresponding to the input image signal.

7. The image processing device of claim 1, wherein when the determination is performed under the second determination condition, the artificial image determining circuit performs gradation determinations in horizontal and vertical directions of the input image in the predetermined area, and determines that the current pixel represents the artificial image when it is determined that the gradation is represented in at least any one of the horizontal and vertical directions.

8. The image processing device of claim 7, wherein the artificial image determining circuit calculates a second absolute value by taking an absolute value to a difference between gradation values of pixels neighboring in the horizontal direction, for each of a plurality of rows in the predetermined area, calculates a second number comprising the second absolute value of each of the plurality of rows in the predetermined area, when the second absolute value is equal to or smaller than a third threshold value, and determines that the predetermined area represents the gradation in the horizontal direction when the second number is greater than a fourth threshold value.

9. The image processing device of claim 7, wherein the artificial image determining circuit calculates a third absolute value by taking an absolute value to a difference between gradation values of pixels neighboring in the vertical direction, calculates a third number comprising the third absolute value of each of a plurality of columns in the predetermined area, when the third absolute value of each of the plurality of columns in the predetermined area is equal to or smaller than a fifth threshold value, and determines that the predetermined area represents the gradation in the vertical direction when the third number of each of the plurality of columns in the predetermined area is greater than a sixth threshold value.

10. The image processing device of claim 1, wherein when the determination is performed under the third determination condition, the artificial image determining circuit calculates the dynamic range for each of three primary colors of light on a basis of a color signal corresponding to the input image signal, and determines that the current pixel in the predetermined area represents the artificial image by using the three calculated dynamic ranges when it is determined that one color of the three primary colors has a larger change and other two primary colors have small changes, or when it is determined that one color of the three primary colors has a smaller change and other two primary colors have large changes.

11. The image processing device of claim 10, wherein the artificial image determining circuit determines that the one color of the three primary colors has the larger change and the other two colors have smaller changes when one of the three calculated dynamic ranges is equal to or greater than a seventh threshold value and other two dynamic ranges are smaller than an eighth threshold value, and determines that the one color of the three primary colors has the smaller change and the other two colors have the large changes when two of the three calculated dynamic ranges are equal to or greater than the seventh threshold value and another dynamic range is smaller than the eighth threshold value.

12. The image processing device of claim 1, wherein the function or logical combination is a logical OR operation of the determined results according to the determination criteria.

13. The image processing device of claim 1, wherein the artificial image determining circuit determines, for each pixel, an artificial image degree, which represents an extent to which the image is artificial, to determine whether an image for each pixel in the input image is in the artificial image.

14. The image processing device of claim 13, wherein the artificial image determining circuit allocates a maximum value of the artificial image degree to a pixel determined as the artificial image as a result of the logical combination, allocates a minimum value of the artificial image degree to a pixel not determined as the artificial image, and determines the artificial image degree for each pixel by performing spatial-filtering on a plurality of pixels to which the artificial image degrees are allocated.

15. The image processing device of claim 1, further comprising:
a first image processing circuit configured to perform a first image process on the input image signal; and
a synthesizing circuit configured to synthesize the input image signal and an image signal on which the first image process is performed.

16. The image processing device of claim 15, wherein the determined result is the artificial image degree, which represents an extent to which each pixel is artificial, and the synthesizing circuit synthesizes, for each pixel, the input image signal and the image processed by the first image processing circuit on a basis of the artificial image degree.

17. The image processing device of claim 1, wherein the artificial image determining circuit further performs a magnification process on the determined result and comprises:
a second image processing circuit configured to perform a second image process comprising the magnification process for the determined result;
a third image processing circuit configured to perform a third image process, which comprises the magnification process and an edge enhancement process, different from the second image process; and
a synthesizing circuit configured to synthesize an image signal on which the second image process is performed and an image signal on which the third image process is performed on a basis of the determined result of the artificial image determining circuit.

18. The image processing device of claim 17, wherein the third image processing circuit determines whether the current pixel is comprised in the flat area on a basis of a pixel value of the current pixel and a pixel value of each of the neighboring pixels, sets at least any one of a lowest correction limit value and a highest correction limit value for each pixel, and clips an image signal on which the magnification process and edge enhancement process are performed with any one of the lowest correction limit value and the highest correction limit value.

19. An image processing method comprising:
determining whether an image is artificial by using two or more different determination criteria for determining whether the image is artificial on a basis of an input image signal, and determining whether an image of each pixel in an input image represented by the input image signal represents an artificial image on a basis of a function or logical combination of results determined under the determination criteria,
wherein the determination criteria comprise any one or more of:
a first determination criterion for determining whether a current pixel is an artificial image by using pixel values of pixels in a predetermined area in which the current pixel and neighboring pixels around the current pixel are present in a matrix arrangement, and by determining whether the predetermined area represents a flat area;
a second determination criterion for determining whether the current pixel represents the artificial image by using gradation values of the pixels comprised in the predetermined area to determine whether the predetermined area represents a gradation area; and
a third determination criterion for determining whether the current pixel represents the artificial image by determining a color change for each of three primary colors of light in the predetermined area based on a dynamic range of a gradation value for each of the neighboring pixels.

20. A program storage device executable by a computer for allowing a computer to function as an artificial image determining apparatus for determining whether an image is artificial by using two or more different determination criteria to determine whether the image is artificial on a basis of an input image signal, and to determine whether an image for each pixel in an input image represented by the input image signal represents an artificial image on a basis of a function or logical combination of results determined under the determination criteria,
wherein the determination criteria comprise any one or more of:
a first determination criterion for determining whether a current pixel is an artificial image by using pixel values of pixels in a predetermined area in which the current pixel and neighboring pixels around the current pixel are present in a matrix arrangement, and by determining whether the predetermined area represents a flat area;
a second determination criterion for determining whether the current pixel represents the artificial image by using gradation values of the pixels in the predetermined area to determine whether the predetermined area represents a gradation area; and
a third determination criterion for determining whether the current pixel represents the artificial image by determining a color change for each of three primary colors of light in the predetermined area based on a dynamic range of a gradation value for each of the neighboring pixels.

* * * * *